United States Patent [19]

Harris

[11] 3,845,517

[45] Nov. 5, 1974

[54] SCRAPER ATTACHMENT

[76] Inventor: James Leslie Harris, P.O. Box 74436, Sulphur, Okla. 73086

[22] Filed: Jan. 10, 1973

[21] Appl. No.: 322,545

[52] U.S. Cl. ................ 15/93 B, 37/105, 172/311, 172/673
[51] Int. Cl. ............................................ A01k 31/04
[58] Field of Search ............... 15/93 B; 404/96, 101; 172/29, 33, 311, 669, 673; 37/105, DIG. 16

[56] References Cited
UNITED STATES PATENTS

| | | | |
|---|---|---|---|
| 355,899 | 1/1887 | Thomas | 172/673 |
| 2,777,220 | 1/1957 | Bates | 37/105 |
| 2,881,581 | 4/1959 | Evans et al. | 172/311 |
| 3,135,337 | 6/1964 | Morris | 172/311 |
| 3,662,420 | 5/1972 | Jordan, Jr. | 15/93 B |
| 3,706,145 | 12/1972 | Bucksch et al. | 37/105 |

FOREIGN PATENTS OR APPLICATIONS 962,945  7/1964  Great Britain ..................... 15/93 B Primary Examiner—Leon G. Machlin
Attorney, Agent, or Firm—Cushman, Darby & Cushman

[57] ABSTRACT

An improved scraper attachment for a conventional vehicle, such as a tractor, having at least a pair of scraper blades extending out from each side of the vehicle and connected to the vehicle by a frame. The blades can be easily moved horizontally toward and away from the frame by operating a crank which rotates a screw mounted on the frame which in turn vertically moves a member engaging the screw threads. This member in turn is attached to the two blades for causing horizontal movement to accommodate scraping troughs of differing widths from walkways also having differing widths. The blades can also be pivoted about a vertical axis to a position behind the vehicle for fitting through doors and the like and up and down to accommodate different trough depths and movement over flat ground. Additional scraper blades can be removably attached to the pair of blades for accommodating troughs having differing widths.

15 Claims, 5 Drawing Figures

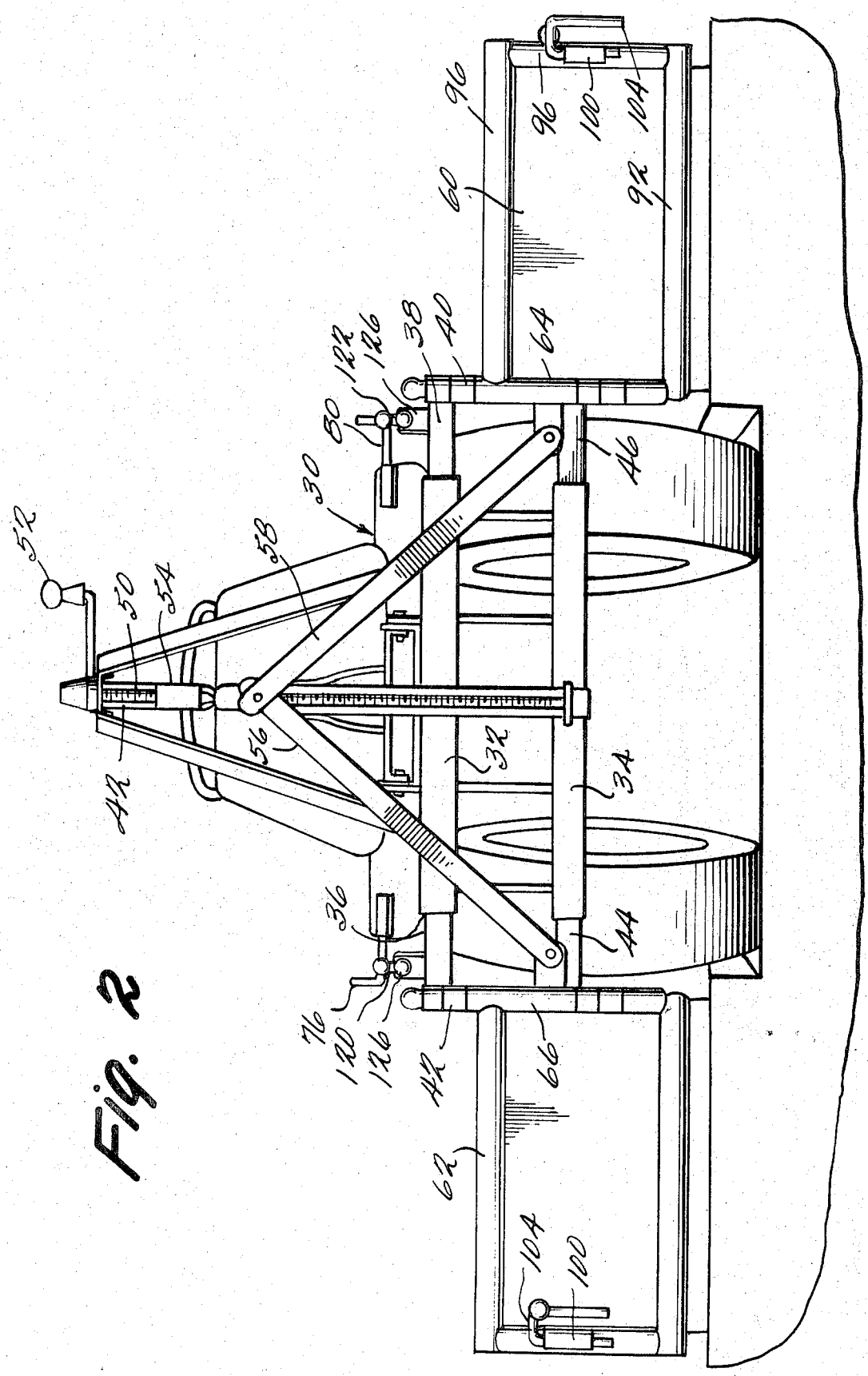

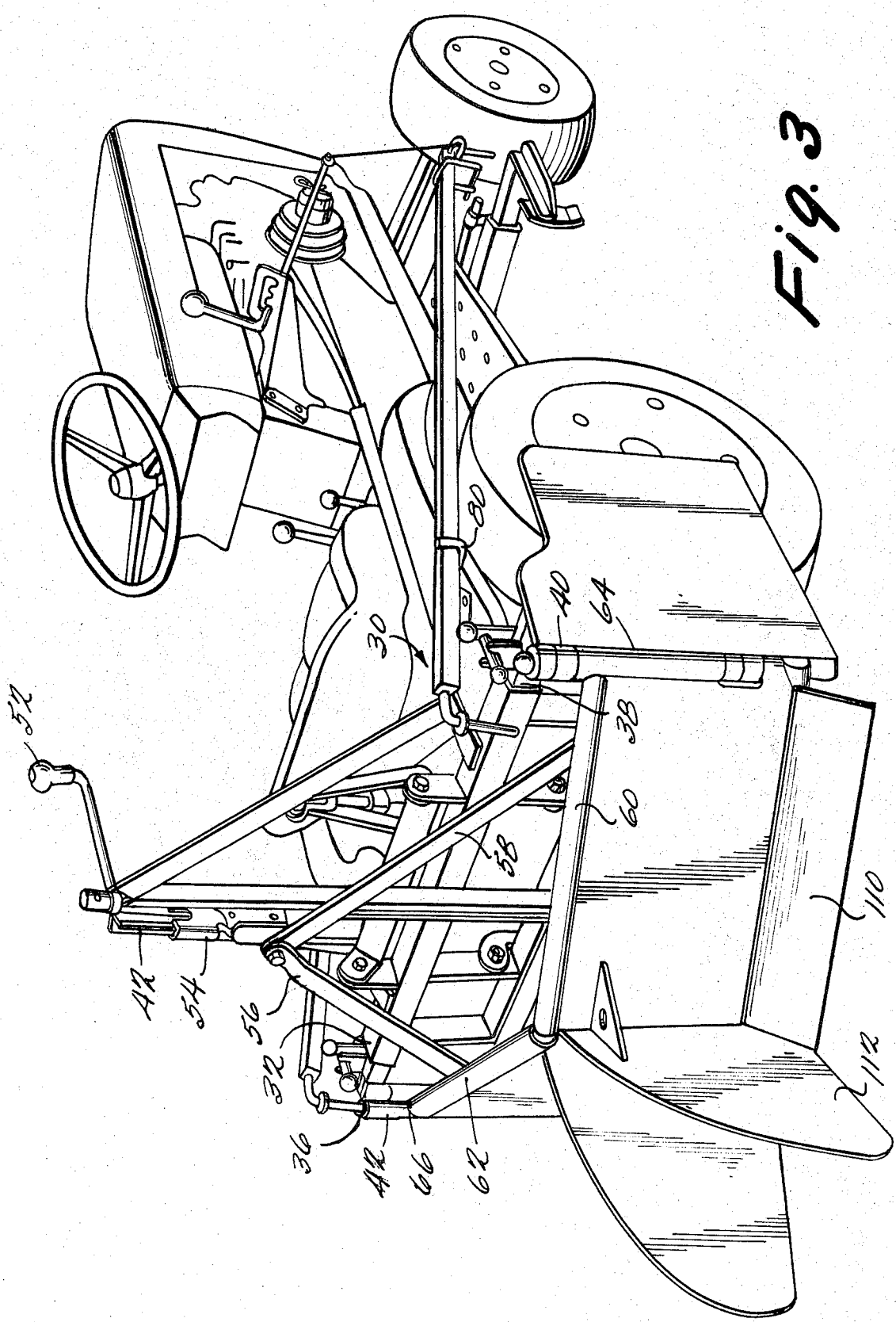

SCRAPER ATTACHMENT

BRIEF DESCRIPTION OF THE PRIOR ART AND SUMMARY OF THE INVENTION

The invention relates to a scraper attachment for a vehicle for scraping manure and the like from pits.

The current trend in the poultry industry is toward total raising of fowl in cages both for egg and food production and toward mechanizing, to the greatest possible extent, feeding, watering and removing waste to minimize labor and other costs. One way to do this is to mount a plurality of fowl cages in a line in a long building. A feeding mechanism such as an auger for moving dry feed periodically supplies food to the fowl in the cages, and a tube likewise runs to each of the cages for supplying water as needed. Typically, a number of rows of cages extend along the length of the building overhanging one of a pair of pits or troughs which are each formed in the floor of the building with a concrete walkway extending between two pits or troughs. The cages may be arranged in a so-called stair-step configuration or otherwise. The manure produced by the birds simply falls through the wire bottom of the cages into the pit below.

With a large operation involving many thousands of fowl, removing this manure is a time-consuming and frequently unpleasant chore. However, to maintain sanitary conditions in the building, the manure must be regularly removed.

One way to carry out this cleaning operation is with a scraper blade which can be fitted onto a conventional garden or farm tractor to extend out from the side of the tractor for scraping waste pits or troughs as the tractor is driven along the concrete walkway. Normally, the attachment has blades which extend on either side of the tractor and scrape the bottom of each of the two pits at the same time that the tractor moves along the walkway. The patent to Crutchfield, U.S. Pat. No. 3,160,041, describes an attachment of this type.

One difficulty in using such a scraper is that there is no uniformity in the construction of pits of these types. The pits come in all widths and depths, and there is great variation of the width of the concrete walkway along which the tractor runs during scraping. Thus, each attachment to date has been substantially designed for a particular pit configuration and no other. This adds greatly to the cost of the unit and further prevents one attachment from being employed to clean several pits in turn which have different dimensions.

Another drawback with attachments of this type previously has been the difficulty in moving the attachments in and out of the buildings which house the birds and which typically have doors of much less width than the width of the pits, and accordingly the width of the scraper blades.

The present invention relates to an improved scraper attachment of this general type which can be easily and quickly connected to a conventional garden or farm tractor, and which can be easily and quickly adjusted to scrape pits in a variety of sizes and constructions as well as a wide range of walkway widths. Further, the scraper blades can be easily and quickly pivoted about a vertical axis to a position extending behind the tractor for movement in and out of the building. When the apparatus is used with a tractor having a vertical lifting capability, the blades can be raised and lowered to accommodate various pit depths and also to permit moving the tractor with the blades attached between buildings over level ground. Accordingly, since the attachment can be used in a variety of situations, the cost of producing it is much less, and the attachment can be further used to quickly clean one pit after another having a variety of sizes.

In the embodiment described in detail below, the attachment includes a frame which connects to the rear of a conventional tractor. A pair of scraper blades which may be of any desired width are pivotably mounted on the frame for rotation about a vertical axis and also for horizontal movement toward and away from the frame and tractor, as tubular members attached to each of the scraper blades slides in hollow members attached to the frame. For effecting horizontal movement in the embodiment described in detail below, a threaded screw is mounted on the frame for manual rotation by a crank. A thread engaging member moves vertically as the screw is rotated and is connected to the scraper blades by means of struts, so that as the member moves vertically with the rotation of the screw, the two scraper blades are easily and quickly moved toward and away from the tractor to accommodate a wide range of walkway widths.

Further, in order to accommodate different widths of pits, additional scraper blades can be removably and easily attached to the initial pair of blades to extend the blades to any desired pit width. The blades preferably include baffles which help in confining the scraper material.

Many other objects and purposes of the invention will be clear from the following detailed description of the drawings.

BRIEF DESCRIPTION OF THE DRAWINGS

FIG. 2 shows a rear view of the attachment mounted on the tractor in FIG. 1.

FIG. 3 shows a perspective view of the tractor with two scraper blades pivoted to a rear position for permitting the tractor and the attachment to pass through a narrow doorway.

DETAILED DESCRIPTION OF THE DRAWINGS

Figure 1:
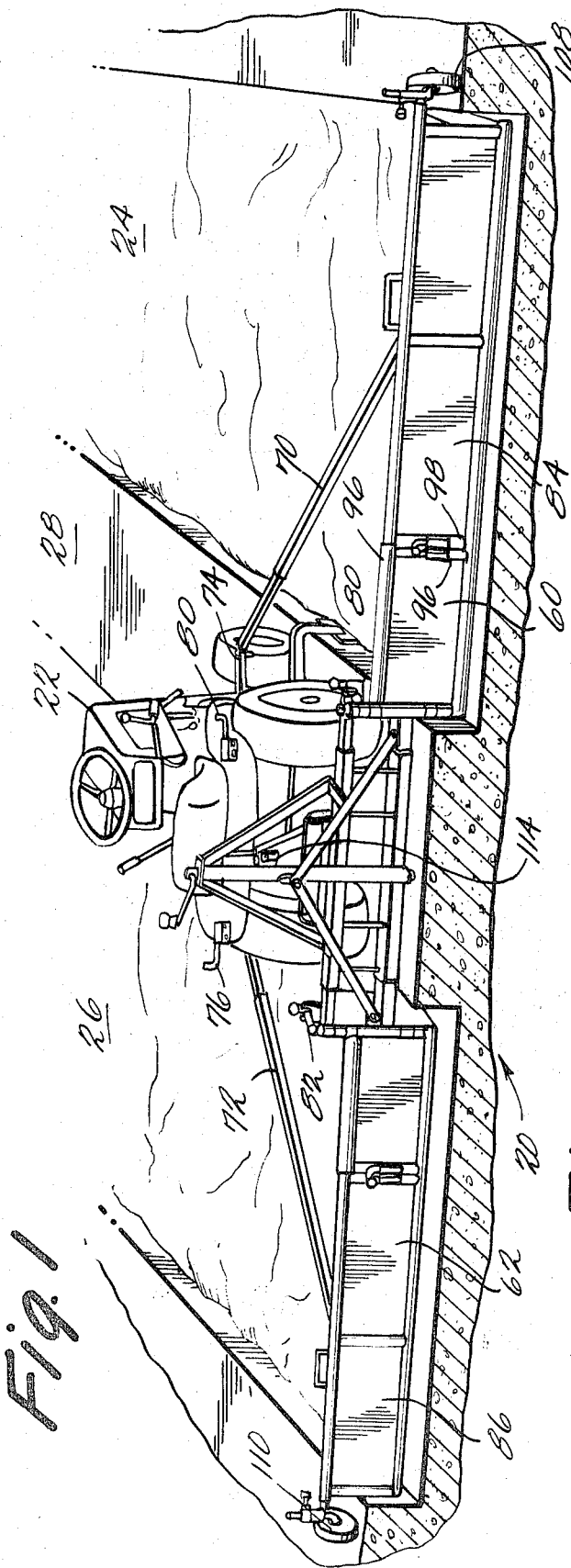
FIG. 1 illustrates the attachment of this invention mounted on a garden tractor and in use scraping a pair of pits as the tractor moves along a walkway between the pits.

Reference is now made to FIG. 1 which illustrates one embodiment of the novel attachment 20 of this invention connected to a conventional garden tractor 22 and shown in use scraping two pits 24 and 26 which extend between a conventional concrete or other walkway 28. Pits 24 and 26 may be below a number of fowl cages or the like which deposit material such as manure which needs to be regularly scraped from pits 24 and 26. A garden tractor, such as tractor 22, normally provide brackets and the like for coupling devices such as attachment 20 behind tractor 22.

As mentioned briefly above, one of the important aspects of the embodiment of this invention is the ability to easily and simply extend the scraper attachments outward away from the frame to accommodate different widths of concrete walkways so that the entire pit can be scraped and at the same time the attachment can be used in a variety of pit constructions having different walkway widths. Referring to FIGS. 1 and 2, frame 30, which attaches to the bracket or the like provided on tractor 22 for that purpose, includes two horizontally extending hollow tubular members 32 and 34 which are fixed in position. Tubular members 36 and 38 are mounted for sliding movement within member 32 and respectively attached to bearing members 40 and 42. Tubular members 44 and 46 are similarly slidably mounted in hollow tubuler member 34 and likewise attach to bearing members 40 and 42.

A threaded screw member 50 is also mounted for rotation in a housing 42 by means of a manually operated crank 52. A member 54 engaging the threads of screw 50 moves vertically as crank 52 and screw 50 are rotated. A pair of struts 56 and 58 are pivotably attached to member 54 for movement with that member at one end and attached respectively at the other end to bearing members 40 and 42 so that these members together with the attached scraper blades move horizontally as the member 54 is raised and lowered by means of crank 52. Thus, the separation between the two scraper blades 60 and 62 can be readily varied as desired to accommodate any concrete walkway width over a considerable range of widths.

Scraper blades 60 and 62 include tubular members 64 and 66 which are journaled for rotation in bearing members 40 and 42 about a vertical axis. These scraper blades, together with any other scraper blades attached to them, as discussed in detail below, however, are normally held in the position illustrated in FIG. 1 during scraping by means of struts 70 and 72 which attach to a scraper blade on each side of tractor 22 and which connect to brackets 74 and 76 which are mounted on the frame of tractor 22 toward the front of the vehicle, and which prevent rotation of scraper blades 60 and 62 as well as any other attached scraper blade during scraping.

However, after scraping has been completed and the vehicle must move out the door to a new location or to a storage location, struts 70 and 72 can be easily pivoted to rest positions on forks 80 and 82 while scraper blades 60 and 62 before or after removal of any additional scrapers are pivoted to a rear position such as shown in FIG. 3. If necessary, the blades can be fixed in that rear position.

To accommodate different widths of pits or troughs which are to be scraped, any of a number of additional scraper blades, such as blades 84 and 86 in FIG. 1 can be attached to blades 60 and 62 so that the combined scraper blade width on each side of the walkway 28 extend the full width of the pit.

Figure 4:
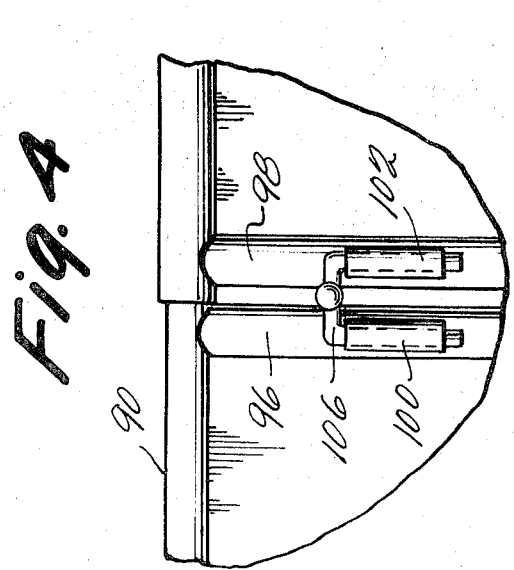
FIG. 4 shows a view of the mechanism for attaching additional scraper blades.

Any convenient way for connecting the scraper blades together can be employed. One way which has been found to be particularly advantageous is to construct scraper blade 60 with upper and lower hollow tubular members 90 and 92 which receive a male portion on a scraper blade which is to be added to scraper blade 60. Vertical tubular members 96 and 98 on scraper blades 60 and 84, respectively, preferably include sleeves 100 and 102 as can be seen in FIG. 4, so that a U-shaped member 106 can be manually and easily inserted to lock scraper blades 60 and 84 removably together. Scraper blades 84 and 86 may be provided at the outermost extent thereof with wheels 108 and 110 which ride on the surfaces at the other side of the respective pits and provide lateral support for the lengthy combined scraper blades.

As can be seen in FIG. 3, the scraper blades include a forwardly inclined scraper edge 110 and a baffle 112 which aids in confining the material which has been scraped. Any suitable number of baffles can be employed for the several scraper blades which normally extend across the pits on either side of the concrete walkway.

Most tractors of the type with which this unit is employed have a mechanism for lifting an attachment. If attachment 20 is used with a tractor of this kind, the blades can be vertically moved to accommodate different widths of pits and also to permit the blades to be raised to a position where the attachment and tractor can be driven over level ground. In FIG. 1, a conventional pneumatic jack 114 is provided together with the tractor for effecting raising and lowering.

Figure 5:
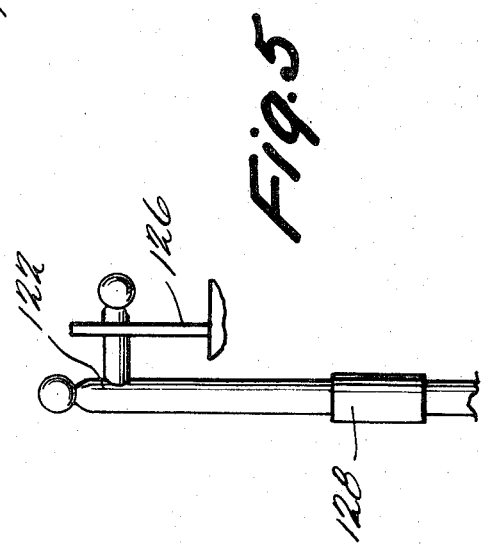
FIG. 5 shows a side view of the back bar.

Frame 30 also preferably includes a pair of back bars 120 and 122 which are normally mounted as shown in FIGS. 5 and 2 with bar 122 engaging notched holder 126. However, bars 122 and 120 can be dropped manually so that the ends reach below the wheels of tractor 30 on either side of the walkway and held in place by a sleeve 128 on frame 30. The tractor can then be backed without danger of falling off the walkway.

Thus, the novel attachment of this application can be easily and readily adjusted for different widths of pits, for different widths of walkways and for different depths of pits. The attachment can thus be used in a variety of different constructions and can be used to clean different construction pits one after another.

Many changes and modifications in the above described embodiment of the invention can, of course, be made without departing from the scope thereof. Accordingly, that scope is intended to be limited only by the scope of the appended claims.

What is claimed is:

1. A scraper attachment for a vehicle comprising:
   a frame for attachment to said vehicle including at least a single horizontally extending, hollow tubular member,
   at least a single scraper blade member,
   means for mounting said scraper blade member on said frame for movement in a horizontal direction toward and away from said frame, and pivotably about a substantially vertical axis, said means for mounting including a further member mounted for sliding movement within said hollow member, and a bearing member attached to said further member and defining a vertical pivoting axis, and
   means mounted on said frame and connected to said mounting means for causing said scraper blade member to move in said horizontal direction toward and away from said frame including
   a screw member,
   means for mounting said screw member on said frame for rotation about a vertical axis,
   crank handle means for manually rotating said screw member,
   means engaging the threads of said screw member for vertical movement as said crank handle means rotates said screw means, and
   strut means connecting said further means to said thread engaging means for causing said further member to move horizontally as said thread engaging means moves vertically.

2. An attachment as in claim 1, further including at least a second scraper blade member, and means for mounting said second scraper blade member on the side of said frame opposite from said first scraper blade member for movement in a horizontal direction toward and away from said frame and pivotably about a substantially vertical axis and wherein said causing means is also connected to said second scraper blade member mounting means for causing second scraper blade member to move with said first blade but in an opposite horizontal direction toward and away from said frame.

3. An attachment as in claim 2 further including a third scraper blade member removably connected to said first scraper blade member and a fourth scraper blade member removably attached to said second scraper blade member.

4. An attachment as in claim 2, including means for holding said first and second scraper blade members at a position preventing vertical pivoting.

5. An attachment as in claim 4 wherein said holding means includes a bracket for attachment to said vehicle at a point remote from the attachment of said frame to said vehicle and a pair of struts attached to said bracket at one end and removably attached to said first and second scraper blade members respectively at the other end.

6. An attachment as in claim 2, wherein each of said scraper blades has a scraper edge engaging the surface to be scraped and at least a single baffle member for confining movement of the scraped material.

7. An attachment as in claim 1, further including a pair of back bars, and means mounting said back bars on either side of said frame for manual movement from a rest position to a position guiding backing of said vehicle.

8. A scraper comprising:
a vehicle,
a frame attached to said vehicle including at least a single horizontally extending hollow tubular member,
at least a single scraper blade member,
means for mounting said scraper blade member on said frame so that said blade member extends transversely to the direction of movement of said vehicle for movement in a horizontal direction toward and away from said vehicle and frame, and pivotably about a substantially vertical axis so that said blade can be pivoted to a position behind said vehicle, said means for mounting including a further member mounted for sliding movement within said hollow member, and a bearing member attached to said further member and defining a vertical pivoting axis, and
means mounted on said frame and connected to said mounting means for causing said scraper blade member to move in said horizontal direction toward and away from said frame including means for mounting a screw member on said frame for rotation about a vertical axis, crank handle means for manually rotating said screw member, means engaging the threads of said screw member for vertical movement as said crank handle means rotates said screw means, and strut means connecting said further means to said threads engaging means for causing said further member to move horizontally as said threads engaging means moves vertically.

9. A scraper as in claim 8 wherein said vehicle is a tractor.

10. A scraper as in claim 8 wherein said vehicle includes means for lifting and lowering said frame.

11. An attachment as in claim 8, further including at least a second scraper blade member, and means for mounting said second scraper blade member on the side of said frame opposite from said first scraper blade member for movement in a horizontal direction toward and away from said frame and pivotably about a substantially vertical axis and wherein said causing means is also connected to said second scraper blade member mounting means for causing said second scraper blade member to move with said first blade but in an opposite horizontal direction toward and away from said frame.

12. An attachment as in claim 11 further including a third scraper blade member removably connected to said first scraper blade member and a fourth scraper blade member removably attached to said second scraper blade member.

13. An attachment as in claim 11 including means for holding said first and second scraper blade members at a position preventing vertical pivoting.

14. An attachment as in claim 13 wherein said holding means includes a bracket for attachment to said vehicle at a point remote from the attachment of said frame to said vehicle and a pair of struts attached to said bracket at one end and removably attached to said first and second scraper blade members respectively at the other end.

15. A scraper as in claim 8 further including a pair of back bars, and means mounting said back bars on either side of said frame for manual movement from a rest position to a position guiding backing of said vehicle.

* * * * *